United States Patent
Shiratori

(10) Patent No.: US 7,399,539 B2
(45) Date of Patent: Jul. 15, 2008

(54) DWDD-TYPE MAGNETO-OPTIC RECORDING MEDIUM INCLUDING BUFFER REGIONS BETWEEN RECORDING TRACK REGIONS AND METHOD OF PRODUCING THE SAME

(75) Inventor: Tsutomu Shiratori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 11/003,431

(22) Filed: Dec. 6, 2004

(65) Prior Publication Data

US 2005/0128641 A1 Jun. 16, 2005

(30) Foreign Application Priority Data

Dec. 15, 2003 (JP) ............................. 2003-416557

(51) Int. Cl.
*G11B 11/105* (2006.01)
*B01J 19/12* (2006.01)
*C23C 14/34* (2006.01)

(52) U.S. Cl. ................ 428/818; 369/13.42; 369/13.43; 369/13.55; 204/192.3

(58) Field of Classification Search ................ None
See application file for complete search history.

(56) References Cited

U.S. PATENT DOCUMENTS

| | | | |
|---|---|---|---|
| 4,412,264 A * | 10/1983 | Imamura et al. ............. | 360/131 |
| 4,853,912 A * | 8/1989 | Akasaka et al. .......... | 369/13.24 |
| 5,629,909 A | 5/1997 | Shiratori ...................... | 369/13 |
| 5,949,743 A | 9/1999 | Shiratori ...................... | 369/13 |
| 5,962,154 A | 10/1999 | Hashimoto et al. ..... | 428/694 ML |
| 6,265,062 B1 | 7/2001 | Shiratori ...................... | 428/332 |
| 6,399,174 B1 | 6/2002 | Shiratori et al. ............ | 428/64.3 |
| 6,403,148 B1 | 6/2002 | Shiratori et al. ............. | 427/128 |
| 6,403,205 B1 | 6/2002 | Shiratori ...................... | 428/212 |
| 6,418,091 B1 * | 7/2002 | Hirokane et al. ......... | 369/13.55 |
| 6,614,731 B2 * | 9/2003 | Ishii ......................... | 369/13.54 |
| 6,690,626 B2 * | 2/2004 | Birukawa et al. ......... | 369/13.55 |
| 6,759,137 B1 * | 7/2004 | Furuya et al. ............... | 428/611 |
| 2004/0264306 A1 * | 12/2004 | Miki et al. ............... | 369/13.55 |

FOREIGN PATENT DOCUMENTS

JP 06-290496 10/1994

\* cited by examiner

*Primary Examiner*—Kevin M Bernatz
(74) *Attorney, Agent, or Firm*—Fitzpatrick, Cella, Harper & Scinto

(57) ABSTRACT

A magneto-optic recording medium has a stacked structure composed of a memory layer, a domain wall displacement layer having domain wall-resistant magnetism smaller than the memory layer, and a switching layer having a lower Curie temperature than these layers interposed between these layers. A recording surface of the magneto-optic recording medium is divided into a plurality of tracks of a predetermined track pitch. A domain wall displacement layer has a recording track region limited in a track width direction in a central portion of each track. A magnetized state of a vertically magnetized memory layer is only transferred in the recording track region. A buffer region is magnetically oriented in an in-plane direction at a predetermined temperature or lower and is vertically magnetized at the predetermined temperature or higher.

15 Claims, 6 Drawing Sheets

DWDD-TYPE MAGNETO-OPTIC RECORDING MEDIUM INCLUDING BUFFER REGIONS BETWEEN RECORDING TRACK REGIONS AND METHOD OF PRODUCING THE SAME

BACKGROUND OF THE INVENTION

1. Field of the Invention

The present invention relates to a magnetic recording medium in which information recording is performed by arrangement conditions of magnetization of a magnetic material, and in particular, to the magnetic recording medium capable of reproducing information with high recording density by generating magnetic wall displacement at the time of reproducing recorded information. Furthermore, the present invention relates to a method of producing such a magnetic recording medium.

2. Related Background Art

Various magnetic recording media are proposed as rewritable information recording media, and some of them are put to practical use. In particular, as a large-capacity recording medium capable of performing high-density recording, expectations have been placed in a magneto-optical medium for recording information by writing a magnetic domain on a magnetic thin film with thermal energy of a semiconductor laser and reading the information by using the magneto-optical effect.

Recently, as digitization of moving images has advanced, the magnetic recording media of a larger capacity are also in increasing demand. In order to make the density of the magnetic record media larger, an important point is how to reproduce high-density recorded information. In general, line recording density of an optical disk such as the magneto-optical medium significantly depends on a laser wavelength of a reproduction optical system and a numerical aperture of an objective lens. To be more specific, if a laser wavelength $\lambda$ of a reproduction optical system and a numerical aperture NA of objective lens are decided, a diameter of a beam waist is decided so that $2 NA/\lambda$ or so becomes a detectable limit of a spatial frequency on reproducing a signal. Therefore, in order to realize a higher density of the optical disk, it is necessary to shorten the laser wavelength $\lambda$ of the reproduction optical system and enlarge the numerical aperture NA of the objective lens.

However, there is a limit (limit of reproducing resolution) to the laser wavelength and the numerical aperture of the objective lens. Therefore, there are developed technologies for allowing recording density to exceed the limit of reproducing resolution by devising a structure and a reproducing method of the recording medium. As an example thereof, there are the magneto-optical medium and the reproducing method thereof capable of reproducing the information having recording density by exceeding the limit of the reproducing resolution of the reproduction optical system without reducing an amplitude of a reproduction signal, as described in Japanese Patent Application Laid-Open No. H6-290496.

This magneto-optical medium adopts a so-called domain wall displacement detection (DWDD) method and has a structure in which a domain wall displacement layer, a switching layer and a memory layer are sequentially stacked. The domain wall displacement layer has domain wall-resistant magnetism (which means a magnetic field capable of starting the displacement of the domain wall by gradual application of the magnetic field, which is different from generally called "coercive force") relatively smaller than the memory layer, and the switching layer has a lower Curie temperature than the domain wall displacement layer and the memory layer.

Recording of the information is performed by forming the magnetic domains according to recorded data in the memory layer. The domain wall displacement layer has recording marks corresponding to the respective magnetic domains formed therein by switched connection with the memory layer. When reproducing the information, predetermined temperature distribution is formed on the medium with a heating beam, and it uses a domain wall displacement due to reduction in domain wall energy in conjunction with a temperature gradient thereof. To be more precise, the temperature gradient displaces the domain wall of the domain wall displacement layer existing in a boundary portion of the recording marks to a region where the switched connection with the memory layer is cut off, and detects a magnetic reversal in conjunction with this domain wall displacement as a change in a polarized state of reflected light. According to this reproducing method, a length of the recording mark in a track direction is extended in proportion to displacement of the domain wall at the time of reproduction. Therefore, it is possible to obtain a sufficient amplitude of the reproduction signal even if the density of the recording marks at the time of recording is enhanced.

As for the reproducing method accompanied by the domain wall displacement described above, it is desirable that the domain wall in a front boundary portion of the recording mark and the domain wall in a back boundary portion of the recording mark are separately and independently formed in substance in order to stabilize the domain wall displacement and improve reproducing characteristics. It is because, in a state of a recording mark surrounded by the domain walls existing on both sides of the recording mark and the front and back domain walls (here, the state of the recording mark surrounded by such closed domain walls is referred to as the state of the domain walls in the front and back of the recording mark being not separated), a new domain wall is generated on a side and domain wall energy increases when the front domain wall is displaced so that an energy gain due to the reduction in the domain wall energy in conjunction with a temperature gradient is canceled. However, as for an ordinary method of producing the medium by sequentially stacking the domain wall displacement layer, a switching layer and a memory layer on a substrate, a roughly uniform recording film is formed in a film plane direction. Therefore, it is difficult to form the recording mark with the front and back domain walls completely separated on such a recording medium.

Thus, as a technique capable of forming the recording mark with the front and back domain walls completely separated, there is a proposed method, for instance, of performing a process of transforming a magnetic film on track sides by annealing both sides of the track with a high-output laser after forming the recording film, and forming the recording mark astride that processed portion. In addition, there are the method of rendering the magnetic film on the track sides adequate by making use of a change in adhering conditions of the magnetic film on a groove side wall in conjunction with a surface form of the substrate such as a groove form, and the method of selectively removing the magnetic film on the groove side wall by etching.

In the case of the technique for causing some change to the magnetic film on the track sides as described above, a region where the change was caused can be used as a buffer region between the tracks. Therefore, the techniques are also effective in controlling cross light and crosstalk between the tracks. The domain wall displacement in the domain wall displacement layer is performed according to a temperature profile based on an isothermal line of domain wall displacement starting temperature of the temperature distribution formed on the medium at the time of reproduction. If performed by the above technique, there is also an effect that, by limiting an effective track width, the form of the domain walls in the front and back boundary portions of the recording mark become relatively linear so that its form consistency with the temperature profile is improved.

However, the above conventional technique is limited as to improvement of track density for the following reasons (1) to (3).

(1) The amplitude of the reproduction signal depends on the area of the recording mark occupying in a spot of a reproducing beam. Therefore, if the effective track width is rendered extremely smaller than a diameter of the spot of the reproducing beam, the area of the recording mark occupying in the spot becomes smaller and the amplitude of the reproduction signal is reduced. Thus, there is a limit to rendering the effective track width smaller.

(2) The track width has fluctuation of various frequency components in its length direction due to influence of processing accuracy and surface conditions. In particular, high-frequency fluctuation in a cycle equivalent to the thickness of the domain wall (for example, 50 nm) blocks the domain wall displacement.

To be more precise, if an energy change amount at the time of displacing the domain wall just by a minute distance dX is dE, a force acting on the domain wall is given by dE/dX. As the magnetic domain (corresponding to the recording mark) is recorded to the limit of the track width, a magnetic domain width changes if the track width changes. For this reason, the magnetic domain width becomes wide in a region where the track width is wide, so that a domain wall amount increases and the energy increases. Inversely, the magnetic domain width becomes narrow in a region where the track width is narrow, so that a domain wall amount decreases and the energy decreases. This energy change influences the domain wall displacement in the track direction. To be more precise, a force for blocking the domain wall displacement acts in a region where the track width becomes wide, and a force for promoting the domain wall displacement acts in a region where the track width becomes narrow. As the action of the force for blocking the domain wall displacement blocks stabilization of the domain wall displacement, the reproducing characteristics will deteriorate. The narrower the track width becomes, the greater the action of the force for blocking the domain wall displacement becomes.

(3) As a track pitch is an addition of the track width and the buffer region, it is thinkable to narrow the buffer region in order to improve the track density. However, the buffer region needs to secure a certain width to control the cross light and so on, and so there is a limit to narrowing the buffer region. In particular, in the case of the method of annealing it with the laser, it is difficult, because of a constraint of a laser spot size in the first place, to narrow the buffer region (anneal region) to that size or less.

SUMMARY OF THE INVENTION

The present invention provides a magnetic recording medium capable of having a high track density, while narrowing an effective recording track width involved in signal reproduction, controlling reduction in an amplitude of a reproduction signal and eliminating influence of a force for blocking or promoting the domain wall displacement in conjunction with high-frequency fluctuation of a track width as well as a producing method thereof.

The magnetic recording medium of the present invention is as follows.

A magnetic recording medium having a plurality of tracks arranged at a predetermined track pitch, including:

a memory layer for accumulating information;

a domain wall displacement layer having domain wall-resistant magnetism smaller than the memory layer;

a switching layer having a lower Curie temperature than the memory layer and domain wall displacement layer and provided between the memory layer and domain wall displacement layer; and a recording track region limited to a width direction of each track and provided in a central portion of each track on the domain wall displacement layer, wherein a magnetized state of the memory layer is transferred into only the recording track region; and a buffer region provided between the recording track regions, wherein the buffer region is magnetized in an in-plane direction at a temperature less than a predetermined temperature and is vertically magnetized at the predetermined temperature or higher to expand the recording track region.

The producing method of the present invention is as follows.

A method of producing the above-described magnetic recording medium includes:

a first step of sequentially film-forming three layers of a memory layer, a switching layer and a nonmagnetic film or in-plane magnetic film on a substrate which is separated into a plurality of tracks at a predetermined track pitch and which has a convex portion or inclined portion including at least an inclined plane in a track width direction and formed in the central portion of each track along a track direction;

a second step of etching the nonmagnetic film or in-plane magnetic film to expose a surface of the switching layer above the top surface of the convex portion or the inclined plane of the inclined portion, and leaving a part of the nonmagnetic film or in-plane magnetic film in a region other than the top surface of the convex portion or the inclined plane of the inclined portion; and a third step of forming a domain wall displacement layer on a surface subjected to an etching process.

A method of producing the above-described magnetic recording medium includes:

a first step of sequentially forming the domain wall displacement layer and a nonmagnetic film or in-plane magnetic film on a substrate which is separated into a plurality of tracks at a predetermined track pitch and which has a convex portion or inclined portion including at least an inclined plane in a track width direction and formed in the central portion of each track along a track direction;

a second step of etching the nonmagnetic film or in-plane magnetic film to expose a surface of the domain wall displacement layer above the top surface of the convex portion or the inclined plane of the inclined portion, and leaving a part of the nonmagnetic film or in-plane magnetic film in a region other than the top surface of the convex portion or the inclined plane of the inclined portion; and a third step of sequentially forming a switching layer and a memory layer on a surface subjected to an etching process.

DETAILED DESCRIPTION OF THE PREFERRED EMBODIMENTS

Figure 1:
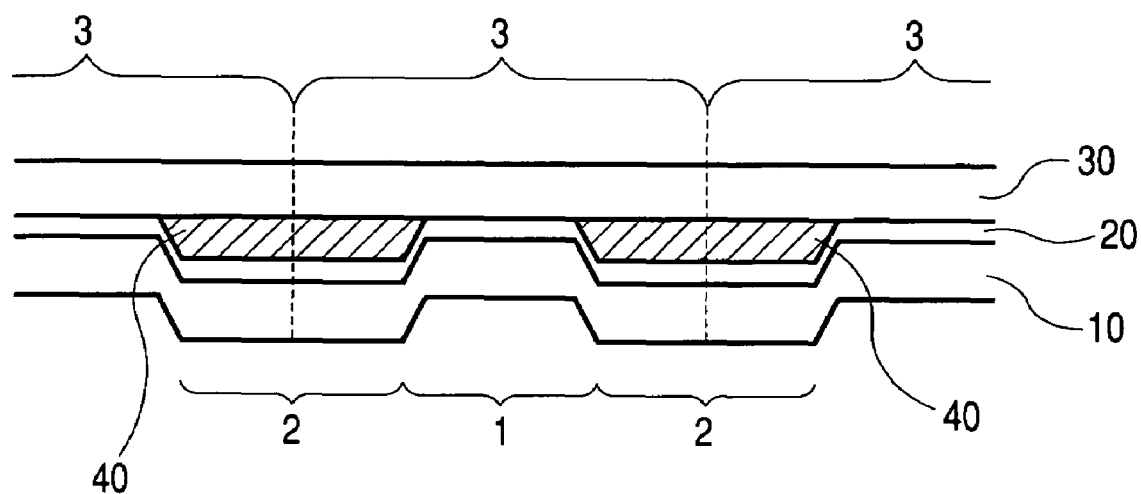
FIG. 1 is a schematic diagram showing a sectional structure of a magnetic recording medium according to an embodiment of the present invention.

FIG. 1 schematically shows a sectional structure of a magnetic recording medium according to an embodiment of the present invention. This magnetic recording medium is a DWDD medium, and has a recording film having a stacked structure of a memory layer 10, a switching layer 20 and a domain wall displacement layer 30 formed on a substrate surface on which convex portions 1 and groove portions 2 are alternately formed. The domain wall displacement layer 30 has domain wall-resistant magnetism relatively smaller than the memory layer 10, and the switching layer 20 has a lower Curie temperature than the memory layer 10 and domain wall displacement layer 30.

The recording film is divided into a plurality of tracks 3, and each of the tracks 3 is separated approximately at the center of the groove portions 2 on both sides thereof so that the convex portion 1 is located at the center. Each of the tracks 3 has a structure having the memory layer 10, switching layer 20 and domain wall displacement layer 30 sequentially stacked in this order in an region on the convex portion 1 (recording track region), and has a structure having an in-plane magnetic film 40 provided between the switching layer 20 and domain wall displacement layer 30 in addition to that stacked structure in a region on the groove portion 2 (buffer region). A surface of the in-plane magnetic film 40 has the same height as the surface of the switching layer 20 on the convex portion 1, and the domain wall displacement layer 30 is a layer of uniform thickness with no bump on the surface.

The domain wall displacement layer 30 is magnetically oriented in a vertical direction by a switched connection with the memory layer 10 (switched connection energy E1) in the recording track region, and is magnetically oriented in an in-plane direction by a switched connection with the in-plane magnetic film 40 (switched connection energy E2) in the buffer region. Both the switched connection energies E1 and E2 drop according to a rise in temperature. An effective anisotropic energy E3 ($=Ku-2\pi Ms^2$) of the domain wall displacement layer 30 can be artificially controlled to an extent by adjusting temperature dependency of saturation magnetization Ms. Here, "Ku" is a true perpendicular magnetic anisotropy. According to this embodiment, the recording film is designed by making use of these characteristics so that, as the temperature rises, the switched connection energy E2 drops and its magnitude relation with the effective anisotropic energy E3 is reversed at a certain temperature (Tt), and the switched connection energy E1 drops and the switched connection between the domain wall displacement layer 30 and memory layer 10 is cut off at a certain temperature (Ts).

Next, recording and reproduction of information on the magnetic recording medium of this embodiment will be described.

The recording of information on the magnetic recording medium is performed by forming a magnetic domain according to a data signal in the memory layer 10 by using an existing thermomagnetic recording method. As for concrete methods, there are two methods. One of the methods is to modulate an external magnetic field correspondingly to the data signal while emitting a laser having power for making the temperature of the memory layer 10 a Curie temperature or higher, and the other method is to modulate laser power correspondingly to the data signal while applying a magnetic field in a certain direction. In the latter case, in order to form a recording magnetic domain having a diameter of a light spot or less and form a high-density recording pattern of a resolution of an optical system or higher, for example, an intensity of the laser should be adjusted so that only a predetermined region in the light spot reaches or exceeds the Curie temperature of the memory layer, or the recording medium should have a structure capable of light modulation overwrite to leave a crescent-shaped magnetic domain while erasing backward at the time of recording.

Figure 2A:
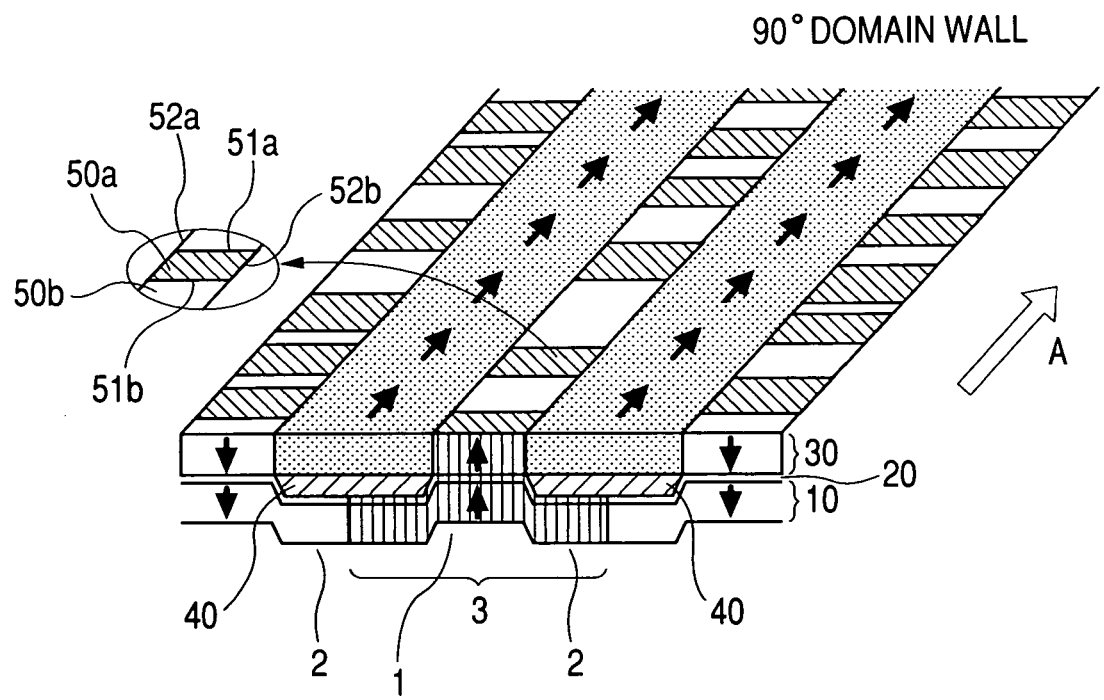
FIG. 2A is a schematic diagram showing a magnetic orientation state of a recording film of the magnetic recording medium shown in FIG. 1 after forming recording marks.

FIG. 2A schematically shows a magnetic orientation state of the recording film after forming recording marks as information by means of the above-described thermomagnetic recording. The memory layer 10 has the first magnetic domain magnetically oriented vertically to face upward and the second magnetic domain magnetically oriented vertically to face downward alternately formed along a track direction. The first and second magnetic domains correspond to the information of "1" and "0" respectively.

A magnetized state of the memory layer 10 is transferred as it is to the recording track region of the domain wall displacement layer 30. A recording mark 50a (shaded region) is formed in a portion corresponding to the first magnetic domain, and a recording mark 50b (outline region) is formed in a portion corresponding to the second magnetic domain, respectively. The switched connection between the memory layer 10 and domain wall displacement layer 30 acts on the magnetic orientation of the recording marks 50a and 50b. In the buffer region of the domain wall displacement layer 30, the state of being magnetically oriented in the in-plane direction is maintained by the switched connection with the in-plane magnetic film 40.

A domain wall 51a is formed in a boundary portion between the recording mark 50a and the recording mark 50b located in the front thereof, and a domain wall 51b is formed in a boundary portion between the recording mark 50a and the recording mark 50b located in the back thereof. Here, the front and back mean the front and back in a displacement direction of the recording medium (arrow A in FIG. 2A) respectively when seen from a reference portion (recording mark 50a in this case).

Domain walls 51a and 51b in the front and back of the recording mark 50a are "180-degree domain walls" (domain walls in which a magnetic moment rotates 180 degrees), and domain walls 52a and 52b on both sides of the recording mark 50a are "90-degree domain walls" (domain walls in which the magnetic moment rotates 90 degrees). The recording mark 50a is surrounded by the domain walls 51a, 51b, 52a and 52b. The recording mark 50b is also surrounded by the "180-degree domain walls" in the front and back and the "90-degree domain walls" on both sides in the same manner as in the recording mark 50a.

Figure 2B:
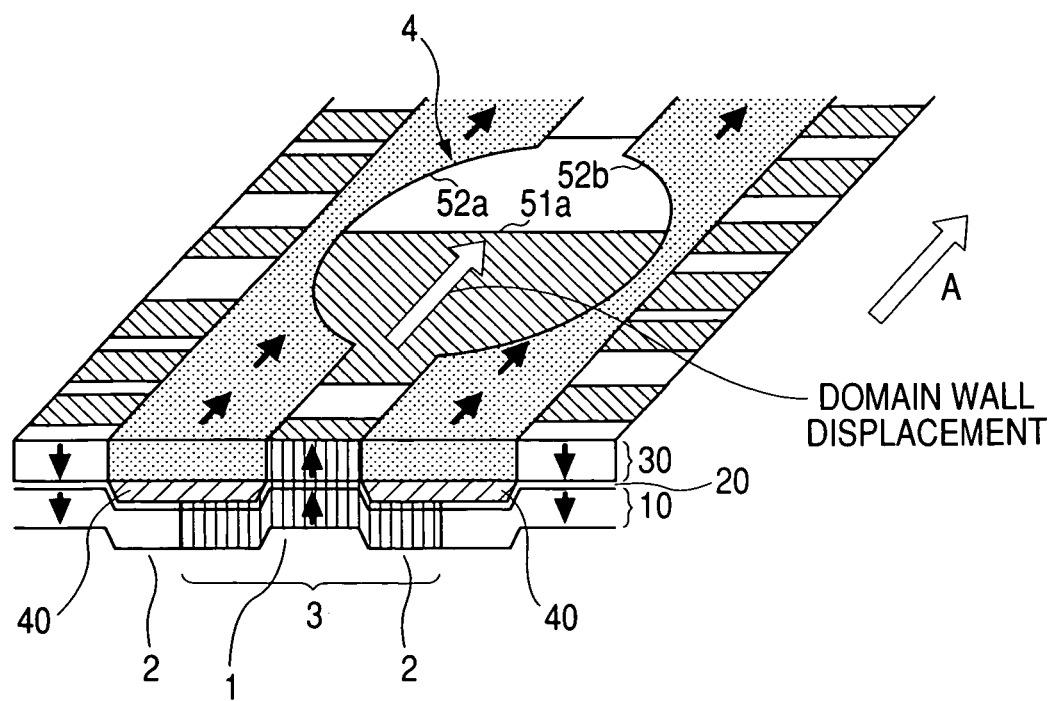
FIG. 2B is a schematic diagram showing a state of displacement and enlargement of a domain wall at the time of reproducing the magnetic recording medium in the magnetic orientation state shown in FIG. 2A.

In the case of reproducing the information, predetermined temperature distribution is formed on the recording film with a heating beam (the heating beam may also be used as a reproducing beam, or external heating means such as a heater may be used in combination with the reproducing beam), and the domain wall of the domain wall displacement layer 30 is displaced in the track direction by its temperature gradient, and a width of the domain wall is enlarged in a track width direction. Next, the reproducing beam is emitted to detect a change in a polarized state of reflected light in conjunction with the displacement and enlargement of the domain wall. FIG. 2B schematically shows the state of the displacement and enlargement of the domain wall at the time of reproduction thereof.

With reference to FIG. 2B, a circular temperature profile 4 is formed on the tracks 3 of the recording film. The temperature profile 4 has its contour formed by an isothermal line of the temperature Tt at which the magnitude relation between the switched connection energy E2 and effective anisotropic energy E3 is reversed in the above predetermined temperature distribution. FIG. 2B shows the state in which, as the recording medium is displaced (arrow A), a part of it approaches the domain wall 51a in the front of the recording mark 50a. The diameter of the temperature profile 4 is larger than the width of the recording track region (which is the same as the width of a top face of the convex portion 1) and smaller than the width of a range including the buffer region formed on both sides of the recording track region (this width is larger than that of the track 3). To be more specific, the temperature profile 4 is formed astride the buffer regions formed on both sides of the recording track region.

In the region inside the temperature profile 4 (heating region), the magnitude relation between the switched connection energy E2 and effective anisotropic energy E3 is reversed so that the region transits from the magnetic orientation state in the in-plane direction to the state capable of causing the magnetic orientation in the vertical direction. In this state, if the domain wall 51a goes into the region of the temperature Ts or higher within the temperature profile 4, it moves to the higher-temperature side of low domain wall energy density according to a temperature gradient and its width expands in the track width direction. The temperature gradient is highest around the center of the temperature profile 4, and it becomes lower at a position farther from the center. Thus, the domain wall 51a moves to around the center of the temperature profile 4.

The reproducing beam is emitted on the recording film together with the heating beam, and the spot thereof is formed from an end on the side of the temperature profile 4 which the domain wall 51a goes into to around the center of the profile. The size of the spot diameter of the reproducing beam should desirably be larger than the width of the recording track region (width of the convex portion 1) and up to about a half of the diameter of the temperature profile 4 in the track direction. It is thereby possible to efficiently detect the change in the polarized state of the reflected light in conjunction with the displacement and enlargement of the domain wall.

As described above, in the temperature profile 4, the domain wall 51a is displaced so that the length of the recording mark 50a in the track direction is extended, and the width of the domain wall 51a is extended so that the length of the recording mark 50a in the track width direction is extended. The recording mark 50a thus enlarged occupies almost the entire region of the spot of the reproducing beam, and so the reproduction signal of a large amplitude can be obtained irrespective of the width of the recording track region.

The temperatures Tt and Ts may be different values. However, it is possible, by designing the recording film to approximately match the temperature Tt to the temperature Ts, to extend the width of the recording track region (width of the recording mark 50a) in the domain wall displacement layer 30 along the temperature profile 4 at the time of the domain wall displacement due to the temperature gradient in the heating region in the temperature profile 4. Thus, it is possible to extend the width of the recording mark to the limit of the width of the temperature profile 4 (width in the track width direction) so as to obtain a larger signal amplitude.

As described above, it is possible, according to the magnetic recording medium of this embodiment, to obtain the reproduction signal of a sufficiently large amplitude even when the recording track region is smaller than the spot diameter of the reproducing beam to therefore improve track density by narrowing of the track width (track pitch).

Hereafter, narrowing of the track width will be concretely described.

Figure 3A:
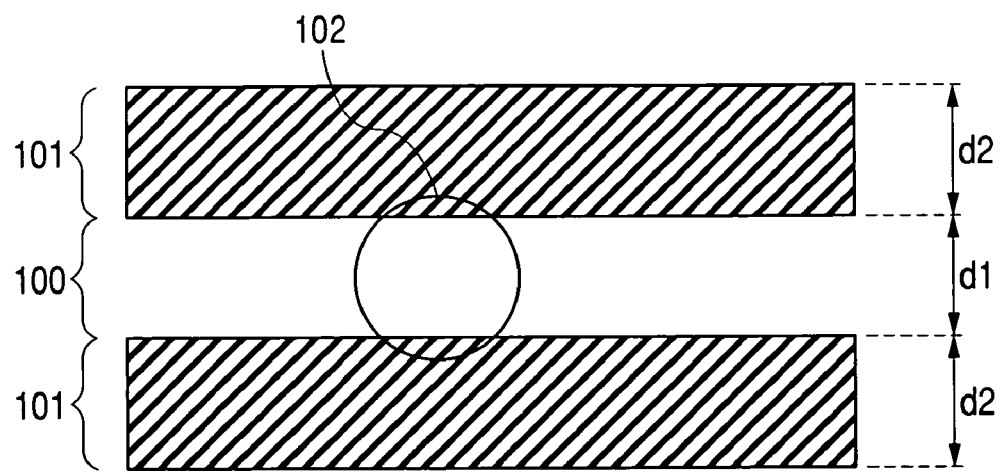
FIG. 3A is a schematic diagram showing a relation between an effective track width of the magnetic recording medium and a size of a reproducing spot as a comparative example in which the domain wall cannot be enlarged in a track width direction at the time of reproduction.

As for the magnetic recording medium incapable of displacing the domain wall in the track direction and extending its width in the track width direction at the time of reproduction, a width d1 of an effective track 100 is normally similar to the diameter of a reproducing beam spot 102 (meaning reproducing resolution here) as shown in FIG. 3A. And buffer regions 101 formed on both sides of the effective track 100 have a width d2 in view of cross light and so on. Therefore, the track width (track pitch) is $$d1+(d2\div2)\times 2.$$

Figure 3B:
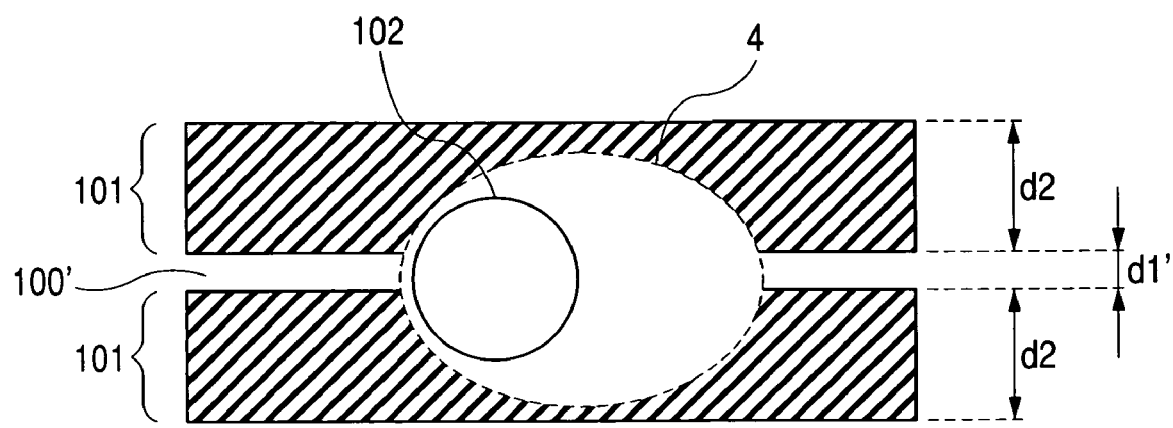
FIG. 3B is a schematic diagram showing a relation between a width of a recording track region of the magnetic recording medium in FIG. 1 and the size of a reproducing spot.

In comparison, according to the magnetic recording medium of this embodiment, a width d1' of a recording track region 100' (corresponding to the effective track 100) can be a value sufficiently smaller than the diameter of the reproducing beam spot 102 as shown in FIG. 3B, and the track width (track pitch) thereof is $$d1'+(d2\div2)\times 2(d1'<<d1)$$

which is smaller than the one in FIG. 3A just by (d1−d1').

As the width d1' of the recording track region is extended at the time of reproduction, the reproduction signal amplitude is not reduced by rendering it sufficiently smaller than the spot diameter of the reproducing beam. Therefore, it is possible to attain a high-density track.

According to the magnetic recording medium of this embodiment, it is also possible to eliminate the influence of forces for blocking and promoting the domain wall displacement in conjunction with high-frequency fluctuation of the track width in addition to the narrowing of the track width. The reason will be briefly described below.

The forces for blocking and promoting the displacement generated in conjunction with high-frequency fluctuation of the track width become greater as the track width drastically changes and energy drastically changes in a short fluctuation cycle. According to the magnetic recording medium of this embodiment, even if the width of the track 3 changes in a cycle equivalent to the thickness of the domain wall, the width of the recording mark (magnetic domain) does not change in such a cycle but is gradually extended according to the temperature profile 4. Therefore, even if the width of the track 3 drastically changes in a short fluctuation cycle, the energy does not change drastically so that the domain wall displacement becomes smooth without action of the force for blocking the domain wall displacement.

According to the magnetic recording medium of this embodiment, the memory layer 10 and switching layer 20 exist in all the regions in the track width direction. However, a magnetized state in the buffer region is not involved in reproducing operation by the displacement and enlargement of the domain wall in the domain wall displacement layer 30. Therefore, even if the magnetized state of this portion changes at the time of performing recording and erasure on an adjacent track, it does not influence signal reproduction so that effective cross erasure/light resistance improves.

Furthermore, an arc-like domain wall is formed in the memory layer 10 and switching layer 20 by reflecting the temperature profile 4 at the time of recording. However, only a linear portion in the central portion of the track in the arc-like domain wall is involved in the reproducing operation. Therefore, form consistency of a detected isothermal line with a displaced domain wall at the time of reproduction is improved, so that high reproducing resolution can be obtained. This effect of improvement in the form consistency also extends a margin for a tracking offset.

The above-mentioned embodiment is just an example of the present invention, and its structure may be changed in the scope of not deviating from the outline of the present invention. For instance, the structure shown in FIG. 1 has the memory layer 10, switching layer 20 and domain wall displacement layer 30 sequentially stacked in the recording track region. It is also possible, however, to place other layers such as a magnetic layer and a nonmagnetic layer in this structure. In addition, in the case of the stacked structure having the switching layer 20 lying between the memory layer 10 and domain wall displacement layer 30, either the memory layer 10 or the domain wall displacement layer 30 may be an upper layer.

The buffer region has a structure in which an in-plane magnetic film 40 is added to the above-described three layers structure so as to arrange the in-plane magnetic film between the switching layer 20 and domain wall displacement layer 30. It is also possible to further insert the magnetic layer having a relatively low Curie temperature between the domain wall displacement layer 30 and in-plane magnetic film 40. In this case, it is possible to completely block off the switched connection between the domain wall displacement layer 30 and in-plane magnetic film 40 on the high-temperature side so as to more securely transit from the in-plane orientation state to the vertical orientation state.

As another structure for more securely transiting from the in-plane orientation state to the vertical orientation state, for example, the domain wall displacement layer 30 may have a stepwise or continuous gradient of the Curie temperature in a film thickness direction so as to lower the Curie temperature on the side contacting the in-plane magnetic film 40. Likewise, the in-plane magnetic film 40 may have the stepwise or continuous gradient of the Curie temperature in the film thickness direction so as to lower the Curie temperature on the side contacting the domain wall displacement layer 30.

It is also possible to use a nonmagnetic film instead of the in-plane magnetic film 40. In this case, a magnetic reversal occurs in a broad region in the domain wall displacement layer 30 at the time of reproduction as the domain wall is displaced to the high-temperature side having a low domain wall energy density together with the domain wall which extends to join with both sides at the moment when the switched connection with the memory layer 10 is cut off. Therefore, the track width contributing to the reproduction is extended and a large signal amplitude can be obtained in spite of the narrow width of the recording track region contributing to storage of the information. In this case, however, it is considered that, as the buffer region of the domain wall displacement layer 30 is in a completely free state, the domain walls join with each other to form a closed domain wall or an unconsidered magnetic reversal occurs due to influence of a floating magnetic field to cause signal noise. Therefore, it is desirable to insert the in-plane magnetic film 40 as in the above-mentioned embodiment. By inserting the in-plane magnetic film 40, for instance, it is possible to have the buffer region of the domain wall displacement layer 30 magnetically oriented in the plane at room temperature. In this state, the "90-degree domain walls" are formed on both sides of the recording mark (boundary portion between the recording track region and the buffer region). These "90-degree domain walls" do not increase or decrease even if the "180-degree domain walls" formed in the front and back of the recording mark are displaced so that the above state is a state equivalent energy-wise to the case where no domain wall exists on both sides of the recording mark, which does not block the displacement of the "180-degree domain walls."

It is also feasible to constitute at least an interface portion of both the domain wall displacement layer 30 and in-plane magnetic film 40 with a Co-based material of a significant switched connection force. In this state, it is possible to increase a change rate of the switched connection force between the domain wall displacement layer 30 as a vertical magnetic film and the in-plane magnetic film 40 for the temperature so as to more clearly transit from the in-plane orientation state to the vertical orientation state.

Furthermore, it is also feasible to insert the nonmagnetic layer between a plane of the in-plane magnetic film 40 on an opposite side of the plane contacting the domain wall displacement layer 30 and the switching layer 20. This structure allows the influence of the switched connection with the memory layer 10 to be reduced on transiting from the in-plane magnetic orientation state to the vertical magnetic orientation state in the buffer region.

According to the above-mentioned embodiment, if the contribution of floating magnetic field is ignored, it is necessary, for the sake of implementing the domain wall displacement, that an energy gain due to reduction in domain wall energy density at the time of minute distance displacement must exceed an energy loss in conjunction with the enlargement of domain wall area in the track width direction. To be more precise, if the domain wall energy density at a position X0 is $\sigma 0$ and the domain wall energy density at a position X1 displaced by a minute distance from the position X0 is $\sigma 1$, the energy gain in conjunction with the reduction in the domain wall energy density is $\sigma 1 \times S - \sigma 0 \times S$ (S is the area of the displaced domain wall). In addition, if the domain wall area at the position X0 is S0 and the domain wall area at the position X1 is S1, the energy loss in conjunction with the enlargement of the domain wall region is $\sigma \times S1 - \sigma \times S0$ ($\sigma$ is the domain wall energy density of the displaced domain wall). In the case where the reduction in the domain wall energy density and the enlargement of the domain wall area occur at the same time, the change in the energy at the time of the minute distance displacement is $$\sigma1 \times S1 - \sigma0 \times S0.$$

If the energy gain in conjunction with the reduction in the domain wall energy density exceeds the energy loss in conjunction with the enlargement of the domain wall area, the change in the energy becomes negative and the domain wall displacement occurs. For this reason, a vertically oriented region of the domain wall displacement layer should have the temperature distribution gradually extended in the width direction for the displacement in the track direction.

Next, a procedure of producing the magnetic recording medium shown in FIG. 1 will be described in detail.

Figure 4A:
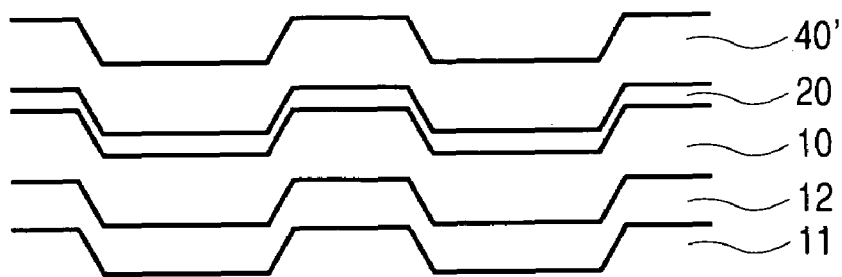
FIGS. 4A, 4B and 4C are sectional views showing the steps for explaining a producing procedure of the magnetic recording medium in FIG. 1.
Figure 4B:
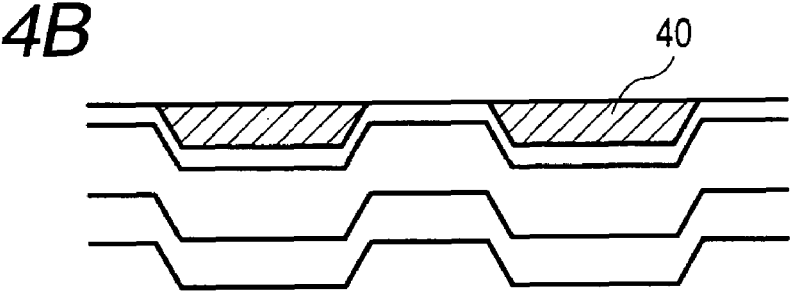
Figure 4C:
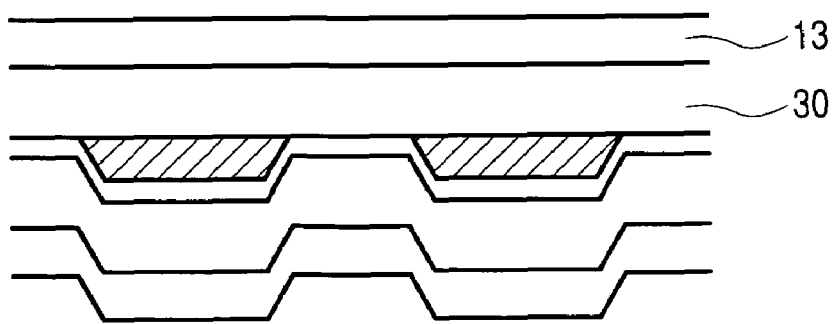

First, as shown in FIG. 4A, an underlying layer 12, a memory layer 10, a switching layer 20 and an in-plane magnetic film 40' are sequentially stacked on a substrate 11 of which surface is processed in a predetermined concavo-convex form. Next, as shown in FIG. 4B, the in-plane magnetic film 40' is etched until the surface of the switching layer 20 on the convex portion is exposed to obtain the in-plane magnetic film 40. As for this etching, the in-plane magnetic film 40' on the convex portion is selectively eliminated by, for example, sputtering-etching so as to expose the switching layer 20 in a lower portion. This etching process utilizes acceleration ion incidence angle dependency of an etching rate. Details of it will be concretely described in Examples 1 to 3 described later. Lastly, as shown in FIG. 4C, the domain wall displacement layer 30 and an upper layer 13 are sequentially stacked to obtain the magnetic recording medium having the stacked structure shown in FIG. 1. The same procedure also applies to the case of using a nonmagnetic layer instead of the in-plane magnetic film.

Figure 5A:
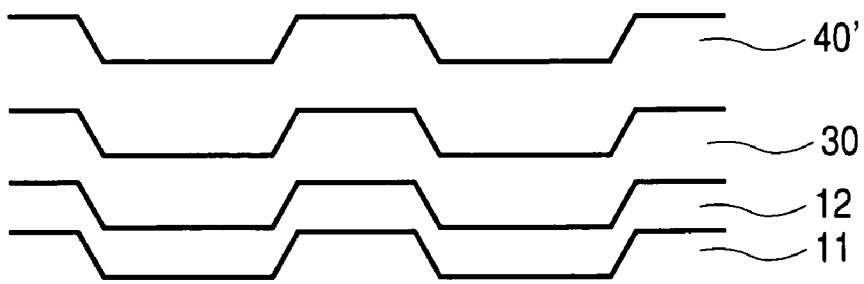
FIGS. 5A, 5B and 5C are sectional views showing the steps for explaining the producing procedure of the magnetic recording medium according to another embodiment of the present invention.
Figure 5B:
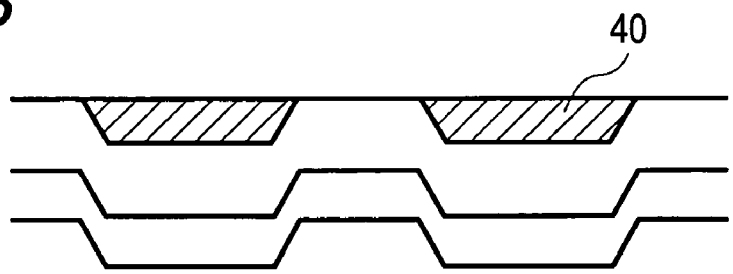
Figure 5C:
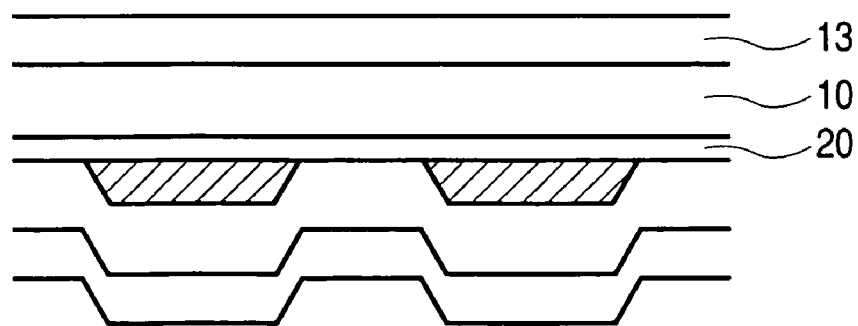

It is also possible, in the producing procedure, to reverse the stacked order of the magnetic layers of the memory layer 10, switching layer 20, domain wall displacement layer 30 and in-plane magnetic film 40. In this case, as shown in FIG. 5A, the underlying layer 12, domain wall displacement layer 30 and in-plane magnetic film 40' are sequentially stacked on the substrate 11 first. Next, as shown in FIG. 5B, the in-plane magnetic film 40' is etched until the surface of the domain wall displacement layer on the convex portion is exposed. Lastly, as shown in FIG. 5C, the switching layer 20, the memory layer 10 and an upper layer 13 are sequentially stacked. In this case, the information is recorded and reproduced through the substrate 11. The same procedure also applies to the case of using the nonmagnetic layer instead of the in-plane magnetic film.

In any producing method described above, it is possible, without performing a special process, to planarize the recording film by setting a height of the convex portion from a substrate surface to match with the film thickness of the nonmagnetic film or in-plane magnetic film remaining in regions other than the convex portion by means of the etching.

As for the material of the substrate 11, polycarbonate resin, acrylic resin, glass and so on may be used for instance. It is not essential to use a translucent material for the substrate 11 except when the information is recorded and reproduced through the substrate 11. As for the underlying layer 12 and upper layer 13, dielectric materials such as SiN, AiN, SiO, ZnS, MgF and TaO may be used for instance.

To adjust thermal characteristics of the recording medium, a metal layer comprised of Al, AlTa, AlTi, AlCr, AlSi, Cu, Pt, Au, Ag or AgSi may be further added.

It is also possible to add a protective coat composed of a polymeric resin.

Furthermore, it is also possible to bond the substrate subjected to the steps of FIGS. 4A and 4B to another substrate having an upper layer 13 and a domain wall displacement layer 30 staked thereon in this order. Likewise, it is also possible to bond the substrate subjected to the steps of FIGS. 5A and 5B to another substrate having an upper layer 13, a memory layer 10 and a switching layer 20 stacked thereon in this order. The recording medium formed by using such a procedure can have the same structure as that shown in FIG. 1.

The memory layer 10, switching layer 20, domain wall displacement layer 30 and in-plane magnetic film 40, underlying layer 12 and upper layer 13 can be adhered and formed by continuous sputtering with a magnetron sputtering apparatus or continuous evaporation. In particular, it is possible, by continuously forming the magnetic layers without breaking a vacuum, to form the magnetic layers other than the in-plane magnetic film 40 for daringly blocking off the switched connection in a state of mutually making the switched connection.

It is possible to constitute the memory layer 10, switching layer 20, domain wall displacement layer 30 and in-plane magnetic film 40 with various magnetic materials such as a magnetic bubble material and an antiferromagnetic material in addition to the materials generally used for the magnetic recording medium and magneto-optical medium. For instance, it is possible to constitute the recording medium with a rare earth-iron group amorphous alloy containing 10 to 40 atomic percent of one or more kinds of rare-earth metal elements such as Pr, Nd, Sm, Eu, Gd, Tb, Dy, Ho and Er and containing 90 to 60 atomic percent of one or more kinds of iron group elements such as Fe, Co and Ni. It is also feasible to add a small amount of the elements such as Cr, Mn, Cu, Ti, Al, Si, Pt and In in order to improve corrosion resistance. Furthermore, it is also possible to use the materials such as platinum group-iron group periodic structure films such as Pt/Co and Pd/Co, a platinum group-iron group alloy film, antiferromagnetic materials such as Co—Ni—O and Fe—Rh based alloys and a magnetic garnet.

In the case of a heavy rare earth-iron group amorphous alloy, the saturation magnetization can be controlled by a composition ratio of the rare-earth elements and iron group elements. It is possible to render the saturation magnetization as small as desired by compensating for rare-earth element auxiliary grid magnetization and iron group element auxiliary grid magnetization. It is also possible to control the Curie temperature by means of the composition ratio. To control it independently of the saturation magnetization, however, it is more desirable to use the method of controlling a replacement amount by using a material in which a part of Fe is replaced with Co as the iron group element. To be more specific, a rise in the Curie temperature of about 6° C. can be expected by replacing 1 atom percent of Fe with Co so that an added amount of Co is adjusted by using this relation so as to have a desired Curie temperature. It is also possible to reduce the Curie temperature inversely by adding a minute amount of nonmagnetic elements such as Cr, Ti and Al. It is also possible to control the Curie temperature by using two or more kinds of rare-earth elements and adjusting the composition ratio thereof.

The domain wall-resistant magnetism and domain wall energy density are mainly controlled by selection of material elements. However, they are also adjustable by the underlying state and the film-forming conditions such as a sputter gas pressure. The Tb- or Dy-based materials have high domain wall-resistant magnetism and domain wall energy density.

The Gd-based materials have low domain wall-resistant magnetism and domain wall energy density. The domain wall-resistant magnetism and domain wall energy density are also adjustable by adding an impure substance. The film thickness is controllable by a film-forming speed and a film-forming time.

Hereafter, Examples 1 to 3 will be described below as concrete examples of the magnetic recording medium according to the above-mentioned embodiment, with showing the results of comparing the respective examples to the comparative examples produced by a conventional producing method.

EXAMPLE 1

In this example, a description will be given as to an instance of using a sample servo method as one of servo control methods of an optical disk apparatus. Here, a disk-like substrate with 0.6-mm thickness divided into 1,280 segments per circuit of the track was prepared as a sample servo format. A clock pit, first and second wobble pits for servo and an address pit are sequentially carved as concavity and convexity at a head of each segment, and the region following it is a data region to be used for recording and reproduction of the information with a magneto-optical signal. The track pitch is 400 nm, and a land portion of which top width is 150 nm, bottom width is 185 nm and height is 30 nm is provided at the center of each track in the data region.

Targets of B-doped Si and Gd, Tb, Fe, Co and Cr were mounted on a DC magnetron sputtering apparatus, and the substrate prepared above was fixed on a substrate holder in a chamber. Then, the inside of the chamber was evacuated with a cryopump until it became a high vacuum of $1 \times 10^{-5}$ Pa or less. While performing the evacuation, an Ar gas was let into the chamber until the inside of the chamber became 0.5 Pa and the layers are formed by sputtering the targets with the substrate being rotated. In film formation of an SiN layer, an $N_2$ gas was let to the chamber in addition to the Ar gas, and the SiN film was formed by DC-responsive sputtering. A concrete producing procedure will be described below in detail.

First, an SiN layer with 35 nm thickness was formed as an underlying enhancement layer. And then, a GdFeCoCr layer having Curie temperature of about 250° C. and thickness of 35 nm was formed as the domain wall displacement layer. Next, a Co film having 60 nm thickness was formed as the in-plane magnetic film.

The substrate after the above-described film formation was carried to a sputtering-etching room equipped with an acceleration ion emission source while holding the vacuum. And an accelerated Ar ion beam was emitted on the substrate surface while neutralizing it from an approximately direction perpendicular to a substrate surface to thereby sputter-etch the film formed on the substrate. Here, the land portion had a trapezoidal cross-section, and both sides of the land were inclined against the substrate surface by about 60 degrees. Therefore, the accelerated ions were emitted to the inclined portion at an incident angle of 60 degrees against a film surface normal direction. For this reason, the film on the inclined portion was sputter-etched faster than the film of flat portions (the accelerated ions were emitted with almost right angle as the incident angle (the incident angle was small)) other than the inclined portion due to dependency of a sputtering rate on the ion incident angle. In this example, while the flat portions of the film were etched by 30 nm, the inclined portions of the film were etched at a large rate three times the rate of the flat portions. Consequently, the film was eliminated over 90 nm from both sides of the land, and the convex portion disappeared and it was planarized. Thus, the in-plane magnetic film (Co film) on the land portion was completely eliminated, and the domain wall displacement layer (GdFeCoCr layer) positioned in the lower part was exposed. The in-plane magnetic film (Co film) having a thickness of 30 nm was left in the flat portions other than the land portion. In this example, the height of the land portion from the substrate surface matched with the 30-nm thickness of the in-plane magnetic film (Co film) left in the flat portions other than the land portion, so that the top surface of the in-plane magnetic film (Co film) matched with the top surface of the film exposed on the land portion in height from the substrate surface.

After the above etching step, the substrate was carried to a DC magnetron sputtering room again, where a TbFeCr layer having Curie temperature of about 160° C. and thickness of 10 nm as the switching layer, a TbFeCoCr layer having Curie temperature of about 300° C. and thickness of 60 nm as the memory layer, and a SiN layer having thickness of 50 nm as the upper protective layer were sequentially formed.

Finally, the disk-like substrate having the films formed thereon was taken out of the vacuum chamber, and a sample was completed by coating the film surface with a 10-μm thick UV resin. This sample had the sectional structure as shown in FIG. 5C.

The produced sample had the structure meeting the same conditions as those of the recording medium disclosed by Japanese Patent Application Laid-Open No. H6-290496 in terms of the domain wall displacement in the track direction. However, it is also possible, in this structure, to further provide a gradient of the Curie temperature to the domain wall displacement layer in the film thickness direction so that the Curie temperature is made lower at a position closer to the switching layer side.

To suppress occurrence of noise due to the domain wall displacement from the back of the reproducing spot, it is also possible to provide, as a control layer, the magnetic layer having domain wall energy density higher than the domain wall displacement layer and Curie temperature higher than the switching layer, between the switching layer and the memory layer.

COMPARATIVE EXAMPLE

In this comparative example, a disk-like substrate was used which had the track pitch divided into zones of 540 nm, 500 nm, 450 nm and 400 nm and had the land portions having a top width of 50 nm, a bottom width of 200 nm and a height of 30 nm provided on both sides of each track in the data region. Similarly to Example 1, the 35-nm thick underlying layer and 35-nm thick domain wall displacement layer were sequentially formed on this substrate. Next, the 10-nm thick switching layer, 60-nm thick memory layer and 50-nm thick upper protective layer were sequentially formed.

Next, the substrate was taken out of the vacuum chamber and carried into an annealing processing apparatus. A local anneal process was carried out by operating a tracking servo on the land portion from the film surface side with the optical system having a wavelength of 405 nm and NA of 0.85, rotating the substrate at a linear velocity of 3 m/sec. and emitting a 4-mW convergent laser beam on the land portion to change the magnetic film to the in-plane magnetic film. Finally, the top surface of the formed films was coated with a 10-μm thick UV resin so as to complete the sample for comparison.

Next, evaluation of the recording and reproduction of the information was performed as to the sample in Example 1 and the samples for comparison produced as described above.

This evaluation used a magneto-optical disk evaluation apparatus having the optical system having a wavelength of 660 nm and NA of 0.60 and a magnetic head for recording of magnetic field modulation. A bit error rate was evaluated by using a (1, 7) RLL method as a modulation method and using a PR (1, −1)+Viterbi method as a decoding method. The magnetic field modulation was recorded at magnetic field intensity of ±200 (Oe) while setting a channel clock at 45 MHz, synchronizing a recording laser to the clock and performing pulse irradiation at a pulse duty of 33 percent.

First, linear recording density dependency of the bit error rate was evaluated by changing the linear velocity with the clock being fixed in the state of having an adjacent track erased. Evaluation results are shown in Table 1.

TABLE 1

|  | Track pitch (nm) | Limit bit density (μm/bit) |
| --- | --- | --- |
| Example 1 | 400 | 0.055 |
| Comparative Example | 540 | 0.065 |
|  | 500 | 0.075 |
|  | 460 | 0.09 |
|  | 400 | 0.14 |

As shown in Table 1, a limit bit density at the bit error rate of $1.0 \times 10^{-4}$ or less was 0.055 μm/bit as to the sample of Example 1. In comparison, it is 0.065 μm/bit, 0.075 μm/bit, 0.09 μm/bit and 0.14 μm/bit in widening order of the track pitch as to the sample for comparison.

Next, a recording power margin and a de-track margin were measured by setting the linear velocity at 2.4 m/sec. and the linear recording density at 0.08 μm/bit with the bit error rate of $5.0 \times 10^{-4}$ as a reference. In measuring the recording power margin, the track to be measured was recorded, the tracks on both sides were sequentially recorded with the same power thereafter and then a central track was measured to measure the margin including the influence of the cross light. In measuring the de-track margin, the margin of providing the same de-track for the recording and reproduction was measured. Measurement results are shown in Table 2.

TABLE 2

|  | Track pitch (nm) | Recording power margin (%) | De-track margin (nm) |
| --- | --- | --- | --- |
| Example 1 | 400 | ±30 | ±95 |
| Comparative Example | 540 | ±25 | ±45 |
|  | 500 | ±12 | ±48 |
|  | 450 | ±2 | ±50 |
|  | 400 | ±0 | ±51 |

As shown in Table 2, the recording power margin was ±30 percent and the de-track margin was ±95 nm as to the sample of Example 1. In comparison, the recording power margin was ±25 percent, ±12 percent, ±2 percent and ±0 percent, and the de-track margin was ±45 nm, ±48 nm, ±50 nm and ±51 nm in widening order of the track pitch as to the samples for comparison.

From the above results, it is understood that, in comparison with the samples for comparison, the sample of Example 1 has a lower limit bit density as well as sufficiently wider recording power margin and de-track margin, thereby making it possible to carry out high-density recording.

EXAMPLE 2

A substrate on which the same sample servo format as that of Example 1 was carved was used to produce the sample for reading the film surface by reversing the stacked order of the magnetic layers. In this case, the land portion disappears on the film surface side, and inside of the data region is in a flat state. As a pit for the servo needs to remain when seen from the film surface side, a pit size on an initial substrate was enlarged allowing for a portion on the pit side to be etched away in the etching process. The track pitch was 175 nm to suit the optical system having a wavelength of 405 nm and NA of 0.85, and the land portion provided at the center of the track had a top width of 65 nm and a bottom width of 80 nm.

First, a 30-nm thick AlSi alloy layer was formed as a heat-radiating layer on the above substrate. Then, the following layers were sequentially formed: a GdFeCoCr layer having Curie temperature of about 360° C. and thickness of 15 nm as an assist layer for improving the magnetic field, a TbFeCoCr layer having Curie temperature of about 300° C. and thickness of 40 nm as the memory layer, a TbFeCr layer having Curie temperature of about 160° C. and thickness of 10 nm as the switching layer, and a TbFeCoCr layer having Curie temperature of 180° C. and thickness of 10 nm as the control layer for suppressing the occurrence of the noise due to the domain wall displacement from the back of the reproducing spot. And then, a 5-nm thick Si film was formed as the nonmagnetic layer and thereafter, a 55-nm thick Co film was formed as the in-plane magnetic film.

After forming the in-plane magnetic film, the substrate was carried to the sputtering-etching room, and an accelerated Xe ion beam was vertically emitted to the substrate surface to etch the film on the flat portion just by 30 nm. At the same time, the film on the land portion was eliminated by 90 nm or more from both sides of the land portion so that the film on the land portion disappeared and the surface was planarized. Thus, the Si film and Co film on the land portion were completely eliminated to expose the TbFeCoCr layer arranged in the lower part. The 5-nm thick Si film and the 25-nm thick Co in-plane magnetic film remained in the other flat portions.

After the etching step, the substrate was carried to the DC magnetron sputtering room again, where two GdFeCoCr layers having Curie temperatures of 210 and 290° C., respectively, were sequentially formed by the thickness of 18 nm as the domain wall displacement layers. And a 50-nm thick SiN layer was formed as an enhancement layer.

Finally, the disk-like substrate subjected to the film formation was taken out of the vacuum chamber, and the top surface of the film was coated with a 15-μm thick UV resin to complete the sample. This sample had the sectional structure as shown in FIG. 4C.

The sample of Example 2 produced as described above was set on a drive apparatus having a magneto-optical head formed by integrating an optical head having a laser wavelength of 405 nm and objective lens NA of 0.85 with the magnetic head for recording the magnetic field modulation. And recording and reproduction characteristics were measured by emitting an optical beam and applying a recording magnetic field from the coat layer side. As for the sample of Example 2, the limit bit density at the bit error rate of $1.0 \times 10^{-4}$ or less is 0.05 μm/bit. And the recording power margin and de-track margin are sufficiently wide similarly to Example 1.

From the above results, it is understood that, in comparison with the sample for comparison, the sample of Example 2 also has a lower limit bit density as well as sufficiently wider recording power margin and de-track margin, thereby making it possible to carry out high-density recording.

EXAMPLE 3

In Example 3, a land/groove substrate for a push-pull servo was used which had a track pitch of 400 nm, a width of the flat portion on the top surface of the land portion being 310 nm, a width of the flat portion on the bottom surface of the groove portion being 250 nm, and a depth of the groove portion of 120 nm. Similarly to Example 1, the underlying enhancement layer, domain wall displacement layer and Co in-plane magnetic film were sequentially formed, and then the same sputtering-etching was performed.

As for the land/groove substrate used in this example, the inclined portion between the land and the groove inclines against the substrate surface by approximately 45 degrees. In the sputtering-etching, similarly to Example 1, the acceleration ion incidence angle dependency of the etching rate was utilized so that, while the film on the flat portion was etched by 20 nm, the film on the inclined portion was etched twice faster. Consequently, the Co in-plane magnetic film on the inclined portion was completely eliminated and the GdFe-CoCr layer positioned in the lower part was exposed. The Co in-plane magnetic film of 40 nm remained in the other flat portions.

Figure 6:
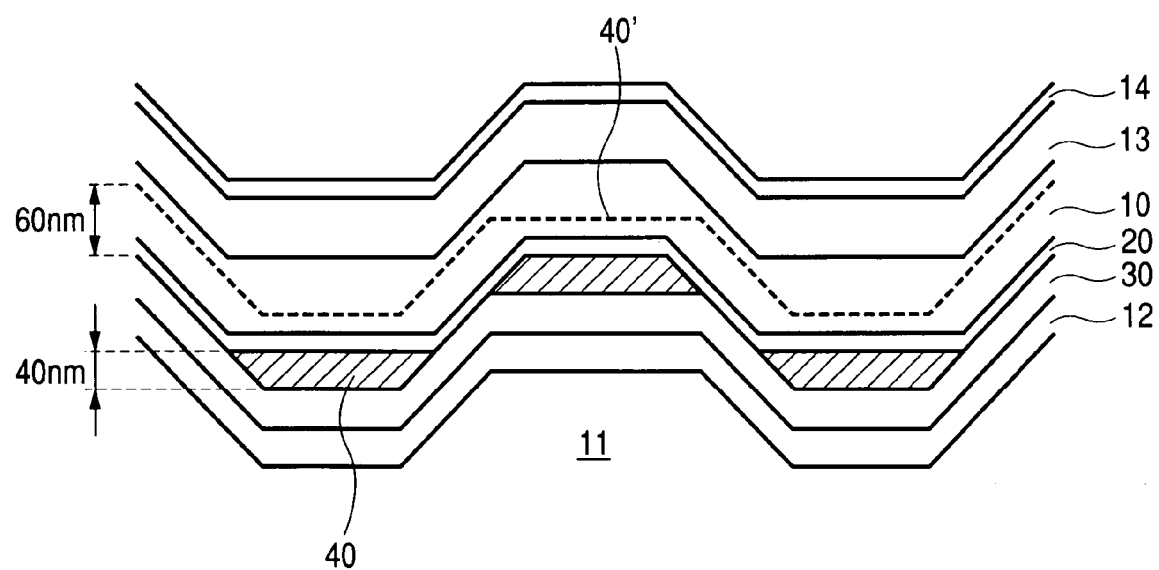
FIG. 6 is a schematic diagram showing the sectional structure of the magnetic recording medium according to another embodiment of the present invention.

After the sputtering-etching step, the switching layer, memory layer and upper protective layer were formed and coated with the UV resin similarly to Example 1. This sample has the sectional structure as shown in FIG. 6. In FIG. 6, the layer indicated in broken line is the in-plane magnetic film 40' before the etching (60-nm thick), and the shaded portion is the in-plane magnetic film 40 after the etching (40-nm thick). The inclined portion between the land and groove portions is the recording track region at the center of the track, and the other region, that is, the region of the in-plane magnetic film 40 is the buffer region. In FIG. 6, reference numeral 11 denotes the substrate, 12 denotes the underlying layer, 13 denotes the upper layer, 14 denotes the UV resin layer, 10 denotes the memory layer, 20 denotes the switching layer and 30 denotes the domain wall displacement layer.

As for the sample produced as described above, DPP (differential push pull) was taken with a sub-beam by using a 3-beam optical system so that a main beam spot was tracked in the inclined portion to measure the recording and reproduction characteristics in the inclined portion. Consequently, the limit bit density at the bit error rate of $1.0 \times 10^{-4}$ or less was 0.055 μm/bit. And the recording power margin and de-track margin are sufficiently wide similarly to Example 1.

From the above results, it is understood that, in comparison with the sample for comparison, the sample of Example 3 also has a lower limit bit density as well as sufficiently wider recording power margin and de-track margin, thereby making it possible to carry out high-density recording.

According to the manufacturing procedure of the magnetic recording medium in Example 3, the domain wall displacement layer 30 and in-plane magnetic film 40 were sequentially formed on the substrate having the inclined portion inclined in the track width direction and formed in the central portion of each track along the track direction, and the in-plane magnetic film 40 was etched thereafter to expose the surface of the domain wall displacement layer 30 on the inclined portion and leave a part of the in-plane magnetic film 40 (in-plane magnetic film 40') in the region other than the inclined portion (buffer region), and then the switching layer 20 and memory layer 10 were sequentially formed on the etched film surface. It is also possible, however, to reverse the stacked order of the layers. In that case, the three layers of the memory layer 10, switching layer 20 and in-plane magnetic film 40 are sequentially formed on the substrate, and the in-plane magnetic film 40 is etched thereafter to expose the surface of the switching layer 20 on the inclined portion and leave a part of the in-plane magnetic film 40 (in-plane magnetic film 40') in the region other than the inclined portion (buffer region), and then the domain wall displacement layer 30 is formed on the etched film surface.

According to the present invention, as is understood from the above description of the examples, it is possible to significantly improve the track density, improve the bit density and extend the de-track margin.

This application claims priority from Japanese Patent Application No. 2003-416557 filed on Dec. 15, 2003, which is hereby incorporated by reference herein.

What is claimed is:

1. A magneto-optic recording medium having a plurality of tracks arranged at a predetermined track pitch, comprising:
   a memory layer for accumulating information;
   a domain wall displacement layer having a domain wall-resistant magnetism smaller than the memory layer;
   a switching layer having a lower Curie temperature than the memory layer and domain wall displacement layer and provided between the memory layer and domain wall displacement layer; and
   a recording track region limited to a width direction of each track and provided in a central portion of each track on the domain wall displacement layer, wherein a magnetized state of the memory layer is transferred into only the recording track region; and
   a buffer region provided between the recording track regions, wherein the buffer region is magnetized in an in-plane direction at a temperature less than a predetermined temperature and vertically magnetized at the predetermined temperature or higher to expand the recording track region, and wherein said predetermined temperature is within normal operating temperatures during reproduction with a reproducing light beam.

2. The magneto-optic recording medium according to claim 1, wherein the buffer region has an in-plane magnetic film between the domain wall displacement layer and the switching layer.

3. The magneto-optic recording medium according to claim 2, wherein the in-plane magnetic film consists of a material having Co as a main component.

4. The magneto-optic recording medium according to claim 2, wherein the in-plane magnetic film is provided in contact with the domain wall displacement layer, and a portion of the domain wall displacement layer at least contacting the in-plane magnetic film consists of a material containing Co.

5. The magneto-optic recording medium according to claim 4, wherein the domain wall displacement layer has a stepwise or continuous gradient of Curie temperature in a film thickness direction so as to lower the Curie temperature on a side contacting the in-plane magnetic film.

6. The magneto-optic recording medium according to claim 4, wherein the in-plane magnetic film has a stepwise or continuous gradient of Curie temperature in a film thickness direction so as to lower the Curie temperature on a side contacting the domain wall displacement layer.

7. The magneto-optic recording medium according to claim 4, wherein a nonmagnetic layer is inserted on a plane of the in-plane magnetic film on an opposite side of a plane of the in-plane magnetic film contacting the domain wall displacement layer.

8. The magneto-optic recording medium according to claim 2, wherein a magnetic layer having a lower Curie temperature than the in-plane magnetic film and domain wall displacement layer is inserted between the in-plane magnetic film and the domain wall displacement layer.

9. The magneto-optic recording medium according to claim 1, wherein the buffer region has a nonmagnetic layer between the domain wall displacement layer and the switching layer.

10. A method of producing a magneto-optic recording medium according to claim 1, comprising:
- a first step of sequentially forming three layers of a memory layer, a switching layer and a nonmagnetic film or in-plane magnetic film on a substrate which is separated into a plurality of tracks at a predetermined track pitch and which has a convex portion or an inclined portion including at least an inclined plane in a track width direction and formed in the central portion of each track along a track direction;
- a second step of etching the nonmagnetic film or in-plane magnetic film to expose a surface of the switching layer above a top surface of the convex portion or the inclined plane of the inclined portion, and leaving a part of the nonmagnetic film or in-plane magnetic film in an region other than the top surface of the convex portion or the inclined plane of the inclined portion; and
- a third step of forming a domain wall displacement layer on a surface subjected to an etching process.

11. A method of producing a magneto-optic recording medium according to claim 1, comprising:
- a first step of sequentially forming a domain wall displacement layer and a nonmagnetic film or in-plane magnetic film on a substrate which is separated into a plurality of tracks at a predetermined track pitch and which has a convex portion or inclined portion including at least an inclined plane in a track width direction and formed in a central portion of each track along a track direction;
- a second step of etching the nonmagnetic film or in-plane magnetic film to expose a surface of the domain wall displacement layer above a top surface of the convex portion or the inclined plane of the inclined portion and leaving a part of the nonmagnetic film or in-plane magnetic film in an region other than the top surface of the convex portion or the inclined plane of the inclined portion; and
- a third step of sequentially forming a switching layer and a memory layer on a surface subjected to an etching process.

12. The method according to claim 10, wherein the etching process is a sputter etching process by an acceleration ion, and an incident angle of the acceleration ion on a side surface of the film on the convex portion or a surface of the film on the inclined portion is larger than the incident angle of the acceleration ion on a surface of the film on an region other than the convex portion or the inclined portion.

13. The method according to claim 11, wherein the etching process is a sputter etching process by an acceleration ion, and an incident angle of the acceleration ion on a side surface of the film on the convex portion or a surface of the film on the inclined portion is larger than the incident angle of the acceleration ion on a surface of the film on an region other than the convex portion or the inclined portion.

14. The method according to claim 12, wherein:
the substrate has the convex portion in the central portion of the track, and a height of the convex portion from a substrate surface is set to match with a film thickness of the nonmagnetic film or the in-plane magnetic film remaining in the region other than the convex portion in the second step.

15. The method according to claim 13, wherein the substrate has the convex portion in the central portion of the track, and a height of the convex portion from a substrate surface is set to match with a film thickness of the nonmagnetic film or the in-plane magnetic film remaining in the region other than the convex portion in the second step.

* * * * *